United States Patent [19]

Cirigiano et al.

[11] Patent Number: 4,756,919

[45] Date of Patent: Jul. 12, 1988

[54] ACID PRESERVATION SYSTEMS FOR FOOD PRODUCTS

[75] Inventors: Michael C. Cirigiano, Bergenfield, N.J.; Jeanne E. Tiberio, Beverly, Mass.

[73] Assignee: Thomas J. Lipton, Englewood Cliffs, N.J.

[21] Appl. No.: 884,971

[22] Filed: Jul. 14, 1986

Related U.S. Application Data

[63] Continuation-in-part of Ser. No. 661,056, Nov. 15, 1984, abandoned, which is a continuation-in-part of Ser. No. 389,978, Jun. 18, 1982, Pat. No. 4,477,478.

[51] Int. Cl.$^4$ .......................... A23L 3/00; A23L 1/24; A23L 1/39; A23L 1/06
[52] U.S. Cl. .................................. 426/330; 426/330.3; 426/330.5; 426/330.6; 426/532; 426/602; 426/605; 426/613; 426/589

[58] Field of Search ............... 426/330, 330.3, , 330.5, 426/330.6, 532, 602, 605, 613, 589

[56] References Cited

U.S. PATENT DOCUMENTS

| | | | |
|---|---|---|---|
| 4,011,346 | 3/1977 | Ernst | 426/532 X |
| 4,145,451 | 3/1979 | Oles | 426/613 X |
| 4,352,832 | 10/1982 | Wood et al. | 426/613 X |
| 4,387,109 | 9/1983 | Kahn et al. | 426/330.6 |

*Primary Examiner*—Jeanette Hunter
*Attorney, Agent, or Firm*—Brumbaugh, Graves, Donohue & Raymond

[57] ABSTRACT

Fumaric acid is used alone or in combination with a food acidulent to preserve acid containing food products from lactic acid bacteria microbiological spoilage in the absence of or at reduced levels of chemical preservative.

18 Claims, No Drawings

ACID PRESERVATION SYSTEMS FOR FOOD PRODUCTS

This application is a continuation-in-part of U.S. application Ser. No. 661,056 filed 11-15-84, now abandoned which is a continuation-in-part of application Ser. No. 389,978, filed 6-18-82, which issued on Oct. 16, 1984, as U.S. Pat. No. 4,477,478.

BACKGROUND OF THE INVENTION

This invention relates to a method of preserving food products against microbiological spoilage and to the preserved food products obtained thereby.

Growing popularity of health foods and natural foods has greatly increased the need for a method of preventing food spoilage without use of the usual chemical food preservatives or lengthy thermal processing times. Even when used, it is desired to employ chemical food preservatives at reduced levels and to reduce the thermal processing time. Additionally, certain organoleptic properties which are desirable in some foods are only obtainable in the absence or reduction of chemical preservatives or with reduced thermal processing time.

Most common food spoilage problems are caused by unwanted growth of bacteria, yeasts and molds. In those foods wherein acid is present, the pH is generally sufficiently low that growth of bacteria which are harmful to man or animals is inhibited. Certain bacteria, molds and yeasts, however, may grow under these pH conditions to cause spoilage.

A recent attempt to solve this problem in low acid foods has been described in U.S. Pat. No. 4,145,451 to Oles, wherein microbiological spoilage is prevented by use of phosphoric acid in synergistic combination with acetic acid, and in the absence of the usual chemical food preservatives. The prior art use of sugar and organic acids for the preservation of food products including salad dressings, mayonnaise, and condiments as well as reference to the well-known relationship between the requirements for sugar and acid as used in the preservation of foods is also discussed in the Oles patent.

SUMMARY OF THE INVENTION

In accordance with the present invention, storage stable acid containing food products may be prepared by adding thereto for preservation purposes fumaric acid or fumaric acid in combination with a food acidulent at a level sufficient to prevent spoilage.

Acid containing food products including soups, sauces for meats, vegetables and fish, marmalades, jellies, jams, syrups, beverages, salad dressings and mayonnaises may thus be produced wherein microbiological spoilage attributable to lactic acid bacteria, and particularly lactobacilli, is prevented with or without the use of chemical preservatives and/or the need for lengthy thermal processing times.

Thus, in accordance with the present invention, a method is provided for preparing low acid food products which are stable against spoilage without the presence of chemical preservatives or with reduced levels of chemical preservative.

Another advantage of the present invention is that low acid food products are stable against spoilage at reduced levels of thermal processing.

An advantage of the present invention is that the need for chemical preservatives and/or lengthy thermal processing times can be reduced and preservation of acid containing food products can be achieved without increasing the total titratable acid content of the food product.

Another advantage of the present invention is that food products having reduced levels of food acidulents are provided at given sugar contents which are preserved against spoilage with or without the use of chemical preservatives and/or lengthy thermal processing times.

An additional advantage of the present invention is that food products are produced which have a lower level of perceived tartness and which thus may be more organoleptically desirable.

DESCRIPTION OF INVENTION

The food compositions of the present invention comprise between 0 and about 60 percent by weight edible oil, between about 20 and about 96 percent by weight moisture, between about 0 and about 30 percent by weight sweetener, and the balance is food solids and a preserving system containing fumaric acid alone or in combination with a food acidulent. The food compositions contain about 0 percent to 1.8 percent food acidulent and about 0.005 percent to 1.5 percent fumaric acid, the percent food acidulent and fumaric acid being expressed as weight percent based on total moisture present. All other percents are calculated as weight percent of the total composition.

Generally, consistent with producing a palatable food composition a food acidulent is added until the desired level of tartness is attained and then fumaric acid is added until effective preservation is achieved. It has been found that even at levels as low as 0.005% fumaric acid effective preservation is obtained. Typical food acidulents are, for example, malic acid, acetic acid, adipic acid, citric acid, phosphoric acid and lactic acid. The relative amounts of food acidulent and fumaric acid added to the product are chosen to provide effective preservation of the food product against microbiological spoilage in the presence or absence of chemical preservatives or at reduced thermal processing times. Alternatively, the relative amounts of food acidulent and fumaric acid are chosen to allow the amount of chemical preservative needed to prevent microbiological spoilage to be reduced.

Microbiological spoilage, as used herein, is that spoilage caused by growth of lactic acid bacteria and particularly lactobacilli. Effective Preservation, as used herein, is die off of lactobacilli at both high and low contamination levels in four weeks. Die off for high level inoculations is at least a 3 log drop in contaminants. Die off for low level inoculations is at least a 1 log drop in contaminants.

In those food products wherein a food acidulent is not normally an ingredient or is not required for flavor, fumaric acid may be used with or without the food acidulent as a preservative to prevent microbiological spoilage in the presence or absence of chemical preservatives. Alternatively, the fumaric acid may be added in quantities sufficient to reduce the amount of chemical preservative required to prevent microbiological spoilage.

Optional ingredients used in producing the food products of this invention include, but are not limited to, tomato pulp, beef extract, microcrystalline cellulose, mustard powder, orange peel, orange juice concentrate, pectin, orange oil, calcium chloride, grape juice, calcium saccharin, peach puree, invert syrup, skim milk, egg yolk, buttermilk, buttermilk solids, dehydrated sour cream, nonfat dry milk, food particulates, such as bacon, cheese and minced vegetables, salt, gums, such as xanthan and algin derivatives, emulsifiers, starch, spices and flavors, ethylenediaminetetraacetic acid (hereinafter EDTA), and chemical preservatives, such as potassium sorbate and sodium benzoate.

The ingredients utilized in the food products of this invention are well known. Any of the well known triglyceride oils or mixtures thereof derived from oil seeds may be used, for example cottonseed, soybean, corn or safflower. Sweeteners including sucrose, dextrose, fructose and corn syrup solids may be used. Sucrose is the preferred sweetener. The level of use of sweetener is determined based on its sweetening power as compared with sucrose as the standard (hereinafter sucrose equivalent). Artificial sweeteners also may be used.

The food acidulent is typically incorporated in the formulations of this invention to a level of about 10% food acidulent.

The acetic acid is typically incorporated in the formulations of this invention as vinegar of about 100 grain strength, i.e., about 10% acetic acid.

The source of egg yolk may be whole eggs or dry or liquid egg yolk and may be fresh or frozen. The egg yolk content is expressed in terms of egg yolk solid in the examples provided herein. The gums, starches, spices and flavors that are utilized in this invention are well known to those in the food industry and are conventionally employed for food uses. While a gum and a starch may be utilized together, generally if a starch is added the gum is omitted and vice versa. Moisture, as used herein, includes moisture in water, buttermilk, lactic acid and other ingredients.

The food products of this invention may be pourable or semisolid, emulsified or nonemulsified, carbonated or uncarbonated, they may contain oil or be oilless as that term is generally understood in food technology. The food products of this invention include, but are not limited to, soups, sauces for meats, vegetables and fish, marmalades, jams, jellies, syrups, beverages, and salad dressings as those terms are broadly understood. A soup is any liquid food made by cooking meat, vegetables and/or fish in a liquid, for example, water or milk. A sauce is any liquid or soft dressing served with food as seasoning. Sauce as used herein is understood to include sauces for meats, vegetables and fish, including all kinds of seafood. A marmalade, jam, and jelly are any thick liquid or semisolid food made with a sweetner, water and fruit juices. A syrup is any thick liquid food made with a sweetner, water and natural or artificial flavorings. A beverage is any liquid food which includes carbonated or uncarbonated drinks. Typical examples of beverages are soft drinks, beer, cider, wine, milk containing drinks, and fruit and vegetable juices and drinks. A salad dressing is any savory liquid or semisolid cooked or uncooked food which may be used as a dressing for salad. Salad dressing as used herein is understood to include but not be limited to: mayonnaise, two-phase Italian dressing, oil-free dressing, French dressing, cucumber dressing, blue cheese dressing, creamy Italian dressing, sour cream and bacon dressing and imitations thereof, including those for which federal standards have and have not been adopted. Salad dressing as used herein is also understood to include that food product similar in appearance to mayonnaise but which is stiffened by an addition of a cooked starch paste. Sandwich spreads utilizing a mayonnaise or salad dressing base are also within the scope of the present invention. It is within the scope of invention that the food products discussed herein may have a reduced or low calorie content.

In those food products which normally include acetic acid as an ingredient an improved effect is observed when the amount of acetic acid is reduced and fumaric acid is substituted therefor in an amount such that the total amount of titratable acid is the same as it would be if only acetic acid had been used.

It has been discovered that if the quantity of the food acidulent is selected so that the desired degree of tartness is achieved, and then fumaric acid is added so that the total titratable acid available is equal to that amount available in the previously formulated food product containing only the food acidulent, the need for chemical preservatives and/or lengthy thermal processing times to prevent microbiological spoilage is eliminated. Alternatively, the amount of chemical preservative and/or the length of thermal processing which is necessary to prevent spoilage is greatly reduced when fumaric acid is added but the total titratable acid is less than the amount of titratable acid present in the original formulation. Only small amounts of fumaric acid need be used alone or in combination with the food acidulent. Generally, as little as about 0.005 percent to about 1.5 percent fumaric acid based on total moisture is necessary. Any food grade fumaric acid is suitable.

Generally, consistent with the aim of producing a palatable food composition for the purpose intended, the food products of this invention may have, for example, any of the ingredients listed in the examples below at the indicated levels. All percents are based on weight percent of the total composition except that the percent fumaric acid and food acidulent (acetic acid) are expressed as weight percent based on total moisture present where indicated.

These formulations are presented by way of example only and other formulations for soups, sauces, marmalades, jellies, jams, syrups, beverages, and dressings for salads are well known in the art and can be used in the practice of this invention. Similarly, the techniques for the manufacture of these products of the types described herein are well known and within the skill of the art and only general preparation descriptions are given.

EXAMPLE 1

A typical soup has the following composition:

| INGREDIENT | WEIGHT PERCENT | |
|---|---|---|
| | Range | Specific Example |
| Tomato Pulp | 50–90 | 76.4 |
| Water | 10–50 | 18.1 |
| Sugar | 0–20 | 1.8 |
| Beef Extract | 0–5 | 1.1 |
| Spices and Flavors | 0–5 | 1.0 |
| Salt | 0–5 | 0.9 |
| Wheat Flour | 0–5 | 0.4 |
| Fumaric Acid | 0.01–1.5 | 0.2 |
| Citric Acid | 0–1 | 0.1 |
| Soybean Oil | 0–60 | 0 |

EXAMPLE 2

A typical sauce has the following composition:

| INGREDIENT | WEIGHT PERCENT | |
|---|---|---|
| | Range | Specific Example |
| Water | 20–90 | 56.3 |
| Soybean Oil | 0–60 | 38.0 |
| Microcrystalline Cellulose | 0–5 | 1.5 |
| Acetic Acid | 0–1.8 | 1.3 |
| Mustard Powder | 0–5 | 1.5 |
| Salt | 0–5 | 0.55 |
| Egg Yolk Solids | 0–8 | 0.30 |
| Fumaric Acid | 0.01–1.5 | 0.30 |
| Gums | 0–2 | 0.15 |
| Potassium Sorbate | 0–1 | 0.10 |

EXAMPLE 3

A typical reduced calorie imitation marmalade has the following composition:

| INGREDIENT | WEIGHT PERCENT | |
|---|---|---|
| | Range | Specific Example |
| Water | 20–90 | 52.56 |
| Sugar | 0–50 | 27.0 |
| Orange Peel | 0–20 | 15.2 |
| Orange Juice Concentrate | 0–8 | 4.0 |
| Pectin | 0–5 | 0.75 |
| Fumaric Acid | 0.01–1.5 | 0.20 |
| Citric Acid | 0–1 | 0.10 |
| Orange Oil | 0–2 | 0.08 |
| Sodium Benzoate | 0–2 | 0.078 |
| Calcium Chloride | 0–1 | 0.03 |
| Coloring | 0–1 | 0.002 |

EXAMPLE 4

A typical reduced calorie imitation jelly has the following composition:

| INGREDIENT | WEIGHT PERCENT | |
|---|---|---|
| | Range | Specific Example |
| Grape Juice | 20–90 | 52.0 |
| Water | 10–50 | 26.0 |
| Sugar | 0–50 | 20.0 |
| Pectin | 0–5 | 1.1 |
| Grape Flavor | 0–2 | 0.5 |
| Fumaric Acid | .01–1.5 | 0.2 |
| Citric Acid | 0–1 | 0.1 |
| Sodium Benzoate | 0–2 | 0.07 |
| Calcium Chloride | 0–1 | 0.03 |

EXAMPLE 5

A typical low calorie syrup has the following composition:

| INGREDIENT | WEIGHT PERCENT | |
|---|---|---|
| | Range | Specific Example |
| Water | 10–99 | 98.502 |
| Gums | 0–1 | 0.55 |
| Strawberry Flavor | 0–2 | 0.24 |
| Fumaric Acid | 0.01–1.5 | 0.30 |
| Citric Acid | 0–1 | 0.15 |
| Calcium Saccharin | 0–2 | 0.15 |
| Sodium Benzoate | 0–2 | 0.10 |
| Certified Color | 0–1 | 0.008 |

EXAMPLE 6

A typical beverage has the following composition:

| INGREDIENT | WEIGHT PERCENT | |
|---|---|---|
| | Range | Specific Example |
| Water | 30–90 | 54.03 |
| Peach Puree (Soluble Solids 13.0–13.5%) | 20–40 | 30.57 |
| Invert Syrup (76.5° Brix) | 5–20 | 11.90 |
| Orange Juice Concentrate (42° Brix) | 0–8 | 3.00 |
| Fumaric Acid | 0.01–1.5 | 0.25 |
| Malic Acid | 0–2 | 0.10 |
| Sodium Benzoate | 0–2 | 0.10 |
| Orange Oil | 0–2 | 0.05 |

EXAMPLE 7

Another typical beverage has the following composition:

| INGREDIENT | WEIGHT PERCENT | |
|---|---|---|
| | Range | Specific Example |
| Water | 30–90 | 65.20 |
| Skim Milk | 10–30 | 14.50 |
| Sugar | 0–30 | 12.35 |
| Orange Concentrate (57.5° Brix) | 1–6 | 3.47 |
| Nonfat Dry Milk | 1–6 | 3.10 |
| Pectin | 0–5 | 0.80 |
| Fumaric Acid | 0.01–1.5 | 0.24 |
| Gums | 0–1 | 0.10 |
| Flavor | 0–1 | 0.10 |
| Sodium Benzoate | 0–2 | 0.10 |
| Color | 0–1 | 0.04 |

EXAMPLE 8

A typical high oil containing dressing for salad, which may be either semisolid or pourable, has the following composition:

| INGREDIENT | WEIGHT PERCENT | |
|---|---|---|
| | Range | Specific Example |
| Oil | 30–60 | 50.0 |
| Moisture | 20–50 | 32.97 |
| Sweetener | 0–20 | 8.0 |
| Egg Yolk | 0–8 | 2.0 |
| Food Particulates | 0–25 | 0 |
| Nonfat Milk Solids | 0–10 | 2 |
| Salt | 0–5 | 1.5 |
| Gums | 0–2 | 0.75 |
| Starch | 0–20 | 0 |
| Spices and Flavors | 0–5 | 2.0 |
| Acetic Acid* | 0–1.8 | 1.1 |
| Fumaric Acid* | 0.01–1.5 | 1.28 |

*Expressed as weight percent based on total moisture.

EXAMPLE 9

A typical low-oil containing dressing for salad, which may be either pourable or semisolid, has the following composition:

| INGREDIENT | WEIGHT PERCENT | |
|---|---|---|
| | Range | Specific Example |
| Oil | 1.5–20 | 15.0 |
| Moisture | 25–90 | 67.22 |
| Sweetener | 0–25 | 10.0 |
| Egg Yolk | 0–8 | 0.0 |
| Emulsifiers | 0–1 | 0.3 |
| Nonfat Milk Solids | 0–10 | 0.0 |
| Salt | 0–5 | 2.0 |

-continued

| INGREDIENT | WEIGHT PERCENT | |
|---|---|---|
| | Range | Specific Example |
| Gums | 0–5 | 1.5 |
| Starch | 0–20 | 0.0 |
| Spices and Flavors | 0–10 | 2.5 |
| Food Particulates | 0–25 | 0.0 |
| Acetic Acid* | 0–1.8 | 0.89 |
| Fumaric Acid* | 0.01–1.5 | 1.31 |

*Expressed as weight percent based on total moisture.

EXAMPLE 10

A typical oilless dressing has the following composition:

| INGREDIENT | WEIGHT PERCENT | |
|---|---|---|
| | Range | Specific Example |
| Oil | ≦1.5 | 0.75 |
| Moisture | 50–96 | 73.02 |
| Sweetener | 0–30 | 15.0 |
| Food Particulates | 0–25 | 2.0 |
| Nonfat Milk Solids | 0–10 | 0.0 |
| Salt | 0–5 | 2.0 |
| Gums | 0–5 | 2.5 |
| Starch | 0–20 | 0.0 |
| Spices and Flavors | 0–10 | 3.0 |
| Acetic Acid* | 0–1.8 | 0.96 |
| Fumaric Acid* | 0.01–1.5 | 1.41 |

*Expressed as weight percent based on total moisture.

The following general procedure was used to produce the sauce formulation in Examples 11–12 and the dressing formulations illustrated by Examples 13–28 except that in Examples 12, 16, 17, 22, 23, 26 and 28 fumaric acid was not added. All numbers in TABLE I, III, V and VI represent weight percent of the total composition except that the percent fumaric and acetic acid are expressed as weight percent based on total moisture where indicated.

Spices and flavors were mixed together in about an 80% vinegar and 20% water solution.

Where used, fumaric acid was added to the water to form a main mix. The main mix was heated until the fumaric acid dissolved (approximately 60° C.).

The main mix was then cooled to approximately 30° C. and the remaining ingredients except the emulsifier and gum were added. The resultant mix was agitated at room temperature.

The emulsifier and gum were mixed with a quantity of oil sufficient to form a slurry which was then transferred to the main mix. The rest of the oil was then added to the main mix which was agitated until the oil was adequately dispersed. The product was then emulsified and bottled. It was stored at refrigeration temperature, (approximately 4° C.) until microbiological testing was begun.

Resistance to spoilage in all examples tested was determined by inoculating duplicate samples of each formulation with $10^1$ to $10^2$ (low level) and $10^4$ to $10^5$ (high level) mixed lactobacilli strains measured as number of organisms/ml of substance and by inoculating samples of each formulation with $10^1$ to $10^2$ and $10^4$ to $10^5$ mixed yeast strains measured as number of organisms/ml of substance. Incubation was at 27° C. and standard microbiological procedures were used to make initial plate counts and plate counts during the test period.

Effective preservation, as used herein, means die off of contaminant at both high and low contamination levels in four weeks. Die off for high level inoculations is at least a 3 log drop in contaminants. Die off for low level inoculations is at least a 1 log drop in contaminants. Borderline preservation, as defined herein, means no increase in contaminant at either the high or low level of inoculation in four weeks. In those cases where growth occurred at either the high or low level, there was no effective preservation as that term has been defined herein.

The results of the microbiological testing on the barbecue sauce formulations in Examples 11 and 12 (Table I) are summarized in Table II. The fumaric acid preservation system in Example 11 demonstrated preservative effectiveness against high and low lactobacilli growth. Example 12, without fumaric acid was stable after a low level inoculation and was stable for 2 months at the higher inoculation level.

TABLE I

| | EXAMPLE | |
|---|---|---|
| INGREDIENT | 11 | 12 |
| Water | 39.95 | 40.00 |
| Brown Sugar | 10.00 | 10.00 |
| Corn Syrup | 18.6 | 18.6 |
| Tomato Paste | 9.26 | 9.26 |
| Distilled Vinegar | 8.40 | 8.40 |
| Soy Sauce | 4.90 | 4.90 |
| Lemon Juice | 1.8 | 1.8 |
| Chili Sauce | 0.40 | 0.40 |
| Mustard Flour | 0.25 | 0.25 |
| Starch | 1.6 | 1.6 |
| Spice Blend | 0.13 | 0.13 |
| Gum | 0.29 | 0.29 |
| Sodium Benzoate | 0.10 | 0.10 |
| Potassium Sorbate | 0.10 | 0.10 |
| EDTA | 0.007 | 0.007 |
| Flavoring | 3.15 | 3.15 |
| Hydrolyzed Vegetable Protein | 0.17 | 0.17 |
| Salt | 0.84 | 0.84 |
| Fumaric acid | 0.05 | 0.00 |

TABLE II

| Example Number | % Fumaric Acid | % Vinegar | Time to Spoilage (Lactobacilli) | | Effective Preservation (Lactobacilli) | pH |
|---|---|---|---|---|---|---|
| | | | High | Low | | |
| 11 | 0.05 | 8.4 | none* | none* | Yes | 3.6 |
| 12 | 0.00 | 8.4 | 2 months | none* | No | 3.6 |

*stable for 16 week test period

The results of the microbiological testing on formulations shown in Examples 13–17 (Table III) are summarized in TABLE IV. The preservation system contained in the formulation of Example 14 demonstrated preservative effectiveness against both high and low lactobacilli growth and was borderline with respect to yeast growth. The preservation system contained in the formulation of Examples 13 and 15 demonstrated preservative effectiveness against both high and low level lactobacilli, but was not effective as a preservative against yeast growth.

The formulation illustrated by Example 16, which contained no fumaric acid, was ineffective as a preservative against yeast at both high and low inoculation levels and was borderline against lactobacilli growth. The formulation illustrated by Example 17, which contained no fumaric acid, was ineffective as a preservative against high and low level lactobacilli and also ineffective against high and low level yeast.

TABLE III

| INGREDIENT | EXAMPLE | | | | |
|---|---|---|---|---|---|
| | 13 | 14 | 15 | 16 | 17 |
| Soybean Oil | 31.9 | 31.9 | 31.9 | 31.9 | 31.9 |
| Moisture | 52.0 | 51.6 | 50.8 | 51.3 | 51.8 |
| Dehydrated Sour Cream | 1.9 | 1.9 | 1.9 | 1.9 | 1.9 |
| Nonfat Dry Milk Solids | 0.9 | 0.9 | 0.9 | 0.9 | 0.9 |
| Sugar | 5.7 | 5.7 | 5.7 | 5.7 | 5.7 |
| Salt | 2.9 | 2.9 | 2.9 | 2.9 | 2.9 |
| Hydrolyzed Yeast | 1.3 | 1.3 | 1.3 | 1.3 | 1.3 |
| Gum | 1.3 | 1.3 | 1.3 | 1.3 | 1.3 |
| Spices and Flavors | 1.0 | 1.0 | 1.0 | 1.0 | 1.0 |
| Emulsifier | 0.3 | 0.3 | 0.3 | 0.3 | 0.3 |
| EDTA | 0.009 | 0.009 | 0.009 | 0.009 | 0.009 |
| Acetic Acid* | 0.96 | 0.97 | 0.98 | 2.9 | 1.91 |
| Fumaric Acid* | 0.47 | 1.47 | 2.85 | 0.0 | 0.0 |

*Expressed as weight percent based on total moisture.

TABLE IV

| Example Number | Fumaric Acid | Acetic Acid | pH | 4th Week Yeast | | Effective Preservation Yeast | 4th Week (Lactobacilli) | | Effective Preservation (Lactobacilli) |
|---|---|---|---|---|---|---|---|---|---|
| | | | | High | Low | | High | Low | |
| 13 | 0.47 | 0.96 | 3.40 | *S | *S | No | <10 | <10 | Yes |
| 14 | 1.41 | 0.97 | 3.50 | $1.4 \times 10^4$ | <10 | Borderline | <10 | <10 | Yes |
| 15 | 2.85 | 0.98 | 2.80 | *S | *S | No | <10 | <10 | Yes |
| 16 | 0.0 | 2.4 | 3.4 | $4 \times 10^5$ | $2.3 \times 10^3$ | No | $5.1 \times 10^4$ | <10 | Borderline |
| 17 | 0.0 | 1.91 | 3.8 | *S | *S | No | $1.1 \times 10^5$ | $3 \times 10^4$ | No |
| 18 | 0.32 | 1.31 | 3.5 | <10 | <10 | Yes | <10 | <10 | Yes |
| 19 | 0.32 | 1.31 | 3.5 | <10 | <10 | Yes | <10 | <10 | Yes |
| 20 | 0.47 | 1.42 | 3.25 | <10 | <10 | Yes | <10 | <10 | Yes |
| 21 | 0.32 | 1.25 | 3.4 | <10 | <10 | Yes | <10 | <10 | Yes |
| 22 | 0.0 | 1.95 | 3.6 | <10 | <10 | Yes | $1.9 \times 10^4$ | $3 \times 10^1$ | Borderline |

*S = Spoilage

Examples 18–22 (Table V) are illustrative of salad dressings having fumaric acid and chemical preservatives.

The results of the microbiological tests on formulations shown in Examples 18–22 are summarized in TABLE IV. It has been observed that the preservation systems contained in the formulation of Examples 18–22 are effective preservatives against lactobacilli at high and low inoculation levels and against yeast at high and low inoculation levels. The formulation illustrated by Example 22, which contained no fumaric acid, was effective as a preservative against yeast but was borderline as a preservative against lactobacilli.

TABLE V

| INGREDIENT | EXAMPLE | | | | |
|---|---|---|---|---|---|
| | 18 | 19 | 20 | 21 | 22 |
| Soybean Oil | 46.9 | 38.8 | 50.0 | 39.2 | 49.9 |
| Moisture | 27.6 | 31.1 | 21.5 | 31.7 | 20.4 |
| Dehydrated Sour Cream | 10.3 | 15.4 | 14.8 | 15.2 | 15.2 |
| Buttermilk | 2.4 | 2.6 | 2.2 | 2.5 | 2.5 |
| Sucrose | 4.2 | 4.3 | 4.3 | 4.3 | 4.3 |
| Salt | 1.4 | 1.6 | 1.6 | 1.6 | 1.6 |
| Lactic Acid | 0.90 | 0.86 | 1.0 | 0.8 | 0.8 |
| Gum | 0.32 | 0.35 | 0.25 | 0.35 | 0.35 |
| Spices and Flavors | 0.09 | 0.1 | 0.37 | 0.29 | 0.25 |
| Food Particulates | 2.45 | 0.9 | 0.2 | 0.0 | 0.0 |
| Sodium Benzoate | 0.1 | 0.1 | 0.1 | 0.1 | 0.1 |
| Potassium Sorbate | 0.2 | 0.2 | 0.1 | 0.1 | 0.2 |
| Nonfat Dry Milk Solids | 2.0 | 2.0 | 2.0 | 2.0 | 2.5 |
| Emulsifier | 0.2 | 0.2 | 0.2 | 0.2 | 0.2 |
| EDTA | 0.007 | 0.007 | 0.007 | 0.007 | 0.007 |
| Acetic Acid* | 0.93 | 1.31 | 1.42 | 1.25 | 1.95 |
| Fumaric Acid* | 0.32 | 0.32 | 0.47 | 0.32 | 0.0 |

*Expressed as weight percent based on total moisture.

Examples 23–28 (Table VI) are illustrative of salad dressings having lower (0.03%–0.050%) levels of fumaric acid.

The results of the microbiological tests on formulations in Examples 23–28 are summarized in TABLE VII. It has been observed that the preservation systems using even the lower levels of fumaric acid contained in the formulation of Examples 23–28 are effective preservatives against lactobacilli at high and low inoculation levels. The formulations of Examples 26 and 28 without fumaric acid had higher levels of lactic acid which did not significantly effect the preservation time thereby illustrating that it is the fumaric acid which is critical to preservation against lactobacilli contamination.

TABLE VI

| Ingredient | Example | | | | | |
|---|---|---|---|---|---|---|
| | 23 | 24 | 25 | 26 | 27 | 28 |
| Moisture (water) | 40.53 | 40.98 | 40.75 | 39.70 | 40.15 | 38.88 |
| Soybean Oil | 19.00 | 19.00 | 19.00 | 19.00 | 19.00 | 19.00 |
| Corn Syrup | 13.73 | 13.73 | 13.73 | 13.73 | 13.73 | 13.73 |
| Tomato Paste | 9.47 | 9.47 | 9.47 | 9.47 | 9.47 | 9.47 |
| Distilled Vinegar | 6.65 | 6.15 | 6.40 | 7.44 | 6.94 | 8.23 |
| Egg Yolk Solids | 2.78 | 2.78 | 2.78 | 2.78 | 2.78 | 2.78 |
| Bacon | 2.00 | 2.00 | 2.00 | 2.00 | 2.00 | 2.00 |
| Pickle Relish | 2.00 | 2.00 | 2.00 | 2.00 | 2.00 | 2.00 |
| Salt | 1.39 | 1.39 | 1.39 | 1.39 | 1.39 | 1.39 |
| Bacon Flavor | 0.40 | 0.40 | 0.40 | 0.40 | 0.40 | 0.40 |
| Chili Flavor | 0.37 | 0.37 | 0.37 | 0.37 | 0.37 | 0.37 |
| Lactic Acid | 0.27 | 0.27 | 0.27 | 0.31 | 0.31 | 0.35 |
| Xanthan | 0.26 | 0.26 | 0.26 | 0.26 | 0.26 | 0.26 |
| Mustard | 0.25 | 0.25 | 0.25 | 0.25 | 0.25 | 0.25 |
| Polysorbate | 0.20 | 0.20 | 0.20 | 0.20 | 0.20 | 0.20 |
| Algin | 0.18 | 0.18 | 0.18 | 0.18 | 0.18 | 0.18 |
| Relish Seasoning | 0.16 | 0.16 | 0.16 | 0.16 | 0.16 | 0.16 |
| Methocel | 0.11 | 0.11 | 0.11 | 0.11 | 0.11 | 0.11 |
| Potassium Sorbate | 0.10 | 0.10 | 0.10 | 0.10 | 0.10 | 0.10 |
| Sodium Benzoate | 0.10 | 0.10 | 0.10 | 0.10 | 0.10 | 0.10 |
| Vinegar Toner | 0.05 | 0.05 | 0.05 | 0.05 | 0.05 | 0.05 |
| EDTA | 0.01 | 0.01 | 0.01 | 0.01 | 0.01 | 0.01 |
| Fumaric Acid | — | 0.05 | 0.03 | — | 0.05 | — |

TABLE VII

| Example Number | % Fumaric Acid | % Vinegar | % Lactic Acid | Time to Spoilage (Lactobacilli) High | Time to Spoilage (Lactobacilli) Low | Effective Preservation (Lactobacilli) | pH |
| --- | --- | --- | --- | --- | --- | --- | --- |
| 23 | 0.0 | 6.65 | 0.27 | 2 weeks | 2 weeks | No | 3.75 |
| 24 | 0.050 | 6.15 | 0.27 | none* | none* | Yes | 3.70 |
| 25 | 0.025 | 6.40 | 0.27 | none* | none* | Yes | 3.75 |
| 26 | 0.0 | 7.44 | 0.31 | 4 weeks | 6 weeks | No | 3.75 |
| 27 | 0.050 | 6.94 | 0.31 | none* | none* | Yes | 3.75 |
| 28 | 0.0 | 8.23 | 0.35 | 6 weeks | 16 weeks | No | 3.70 |

*stable for 16 week test period

While these examples described what are believed to be preferred embodiments of the present invention, those skilled in the art will recognize that other and further modifications may be made thereto without departing from the spirit of the invention and it is intended to claim all such changes as fall within the true scope of the invention.

We claim:

1. In a food composition having a moisture content between about 10 and about 99 percent by weight and being susceptible to spoilage by lactic acid bacteria, the improvement comprising providing in the food composition a preservative comprising fumaric acid in an amount between about 0.005 and about 1.5 percent by weight based on the moisture content of the food composition and wherein the amount of fumaric acid is sufficient to preserve the food composition against spoilage.

2. A food composition according to claim 1 in which the preservative further comprises a food acidulent in an amount up to 1.8 percent by weight based on the moisture content of the food composition and wherein the combined amounts of fumaric acid and food acidulent are sufficient to preserve the food composition against spoilage.

3. A food composition according to claim 2 in which the food acidulent is an acid selected from the group consisting of malic, acetic, adipic, citric, phosphoric and lactic.

4. A food composition according to claim 1 in which the food composition is selected from the group consisting of soups, sauces, marmalades, jellies, jams, syrups, and beverages.

5. A food composition according to claim 1 in which the preservative further comprises a chemical preservative.

6. In a method of preserving a food composition having a moisture content between about 10 and about 96 percent by weight against spoilage caused by lactic acid bacteria, the improvement comprising adding fumaric acid to the food composition in an amount between about 0.005 and 1.5 percent by weight based on the moisture content of the food, and wherein the amount of fumaric acid is sufficient to preserve the food composition against spoilage.

7. A method according to claim 6 further comprising adding to the food composition a food acidulent in an amount up to about 1.8 percent by weight based on the moisture content of the food composition, and wherein the combined amounts of fumaric acid and food acidulent are sufficient to preserve the food composition against spoilage.

8. A method according to claim 6, further comprising the step of adding a chemical preservative to the food composition.

9. A soup which is susceptible to microbiological spoilage by lactic acid bacteria comprising at least one ingredient which is a liquid food prepared by cooking a member of the group consisting of meat, vegetables and fish in a liquid, between 0 and about 60 percent by weight moisture, between 0 and about 20 percent by weight sweetener, as sucrose equivalent, between 0 and about 1.8 percent by weight food acidulent, based on total moisture content of the soup, and between about 0.005 and 1.5 percent by weight fumaric acid or the combined amounts of fumaric acid and food acidulent being effective to preserve the soup against microbiological spoilage.

10. A soup according to claim 9, further comprising a chemical preservative.

11. A sauce which is susceptible to microbiological spoilage by lactic acid bacteria comprising a seasoned liquid containing between about 0 and 60 percent by weight edible oil, between about 20 and about 90 percent by weight moisture, between 0 and about 1.8 percent by weight food acidulent, based on total moisture content of the sauce, and between about 0.005 and about 1.5 percent by weight fumaric acid, based on total moisture content of the sauce, the amount of fumaric acid or the combined amounts of fumaric acid and food acidulent being effective to preserve the sauce against microbiological spoilage.

12. A sauce according to claim 11, further comprising a chemical preservative.

13. A fruit preserve composition selected from the group consisting of marmalade, jelly and jam susceptible to microbiological spoilage by lactic acid bacteria, comprising fruit juices, a gelling agent, between 0 and about 60 percent by weight edible oil, between about 10 and about 90 percent by weight moisture, between 0 and about 50 percent by weight sweetener, as sucrose equivalent, between 0 and about 1.8 percent by weight food acidulent, based on total moisture content of the fruit preserve composition, and between 0.005 and 1.5 percent by weight fumaric acid, based on the total moisture content of the fruit preserve composition, the amount of fumaric acid or the combined amounts of fumaric acid and food acidulent being effective to preserve the fruit preserve composition against spoilage.

14. A fruit preserve composition according to claim 13, further comprising a chemical preservative.

15. A syrup which is susceptible to microbiological spoilage by lactic acid bacteria comprising at least one ingredient selected from the group consisting of thick liquid foods made with a sweetner, water and flavorings, between 0 and about 60 percent by weight edible oil, between about 10 to about 90 percent by weight moisture, between 0 and about 1.8 percent by weight food acidulent, based on total moisture content of the syrup, and between about 0.005 and about 1.5 percent by weight fumaric acid, based on total moisture content of the syrup, the amount of fumaric acid and the amount of fumaric acid or the combined amounts of fumaric acid and food acidulent being effective to preserve the syrup against microbiological spoilage.

16. A syrup according to claim 15, further comprising a chemical preservative.

17. A beverage which is susceptible to microbiological spoilage by lactic acid bacteria comprising at least one ingredient selected from the group consisting of carbonated and uncarbonated liquid food, between 0 and about 60 percent by weight edible oil, between about 30 and about 90 percent by weight moisture, between 0 and about 30 percent by weight sweetner, as sucrose equivalent, between 0 and about 1.8 percent by weight food acidulent, based on total moisture content of the beverage, and between about 0.005 and about 1.5 percent by weight fumaric acid, based on total moisture content of the beverage, the amount of fumaric acid or the combined amounts of fumaric acid and food acidulent being effective to preserve the beverage against microbiological spoilage.

18. A beverage according to claim 17, further comprising a chemical preservative.

* * * * *

UNITED STATES PATENT AND TRADEMARK OFFICE
CERTIFICATE OF CORRECTION

PATENT NO. : 4,756,919
DATED : 07/12/88
INVENTOR(S) : Cirigliano et al

It is certified that error appears in the above-identified patent and that said Letters Patent is hereby corrected as shown below:

First page, heading of patent and Item [75], "Cirigiano" should read --Cirigliano--;

First page, Item [73], after "Lipton," insert --Inc.--;

Col. 12, line 61, "sweetner" should be --sweetener--;

Col. 13, line 12, "sweetner" should be --sweetener--;

Bridging col. 12, last line, and col. 13, first line, delete "and the amount of fumaric acid"; and The face of the patent should be amended by adding thereto the following notice:

--The term of this patent subsequent to October 16, 2001, has been disclaimed.--

Signed and Sealed this

Seventh Day of March, 1989

Attest:

DONALD J. QUIGG

Attesting Officer

Commissioner of Patents and Trademarks